United States Patent
Li et al.

(10) Patent No.: US 6,373,324 B2
(45) Date of Patent: *Apr. 16, 2002

(54) VOLTAGE BLOCKING METHOD AND APPARATUS FOR A CHARGE PUMP WITH DIODE CONNECTED PULL-UP AND PULL-DOWN ON BOOT NODES

(75) Inventors: Bo Li; Jahanshier Javanifard, both of Sacramento, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/475,459

(22) Filed: Dec. 30, 1999

Related U.S. Application Data

(63) Continuation-in-part of application No. 09/137,977, filed on Aug. 21, 1998, now abandoned.

(51) Int. Cl.$^7$ ................................................ G05F 1/10
(52) U.S. Cl. .................................................... 327/536
(58) Field of Search .................... 327/534, 535, 327/536, 537

(56) References Cited

U.S. PATENT DOCUMENTS

| | | | | |
|---|---|---|---|---|
| 5,140,182 A | * | 8/1992 | Ichimura | 307/296.1 |
| 5,301,097 A | | 4/1994 | McDaniel | 363/60 |
| 5,414,669 A | | 5/1995 | Tedrow et al. | 365/226 |
| 5,422,586 A | | 6/1995 | Tedrow et al. | 327/306 |
| 5,422,590 A | * | 6/1995 | Coffman et al. | 327/537 |
| 5,426,391 A | | 6/1995 | Tedrow | 327/530 |
| 5,430,402 A | | 7/1995 | Tedrow et al. | 327/530 |
| 5,446,408 A | | 8/1995 | Tedrow et al. | 327/530 |
| 5,483,486 A | | 1/1996 | Javanifard et al. | 365/185.17 |
| 5,589,793 A | | 12/1996 | Kassapian | 327/536 |
| 5,650,671 A | | 7/1997 | Pascucci et al. | 307/110 |
| 5,734,290 A | | 3/1998 | Chang et al. | 327/536 |
| 5,821,805 A | | 10/1998 | Jinbo | 327/537 |
| 5,841,703 A | | 11/1998 | Wojciechowski | 365/189.01 |
| 5,973,546 A | | 10/1999 | Le et al. | 327/536 |
| 5,982,224 A | | 11/1999 | Chung et al. | 327/536 |
| 6,023,188 A | * | 2/2000 | Lee et al. | 327/536 |
| 6,151,229 A | | 11/2000 | Taub et al. | 363/60 |
| 6,292,048 B1 | * | 9/2001 | Li | 327/536 |

* cited by examiner

*Primary Examiner*—Jeffrey Zweizig
(74) *Attorney, Agent, or Firm*—Calvin E. Wells

(57) ABSTRACT

A negative charge pump circuit is disclosed. The pump circuit includes several stages, each stage including a switching transistor, a pull up diode, and a pull down diode. The pump circuit also includes a blocking transistor coupled between the gate terminal of the switching transistor and the pull down diode of the third stage. The gate terminal of the blocking transistor is electrically coupled to the source terminal of the switching transistor of the first stage where the first stage provides the output for the negative charge pump circuit. A voltage present at the output of the first stage is delivered to the gate terminal of the switching transistor of the third stage when a positive programming voltage is present at the output of the first stage in order to block the positive programming voltage from shorting to ground through the negative pump circuit. The blocking transistor prevents the voltage applied to the gate of the switching transistor of the third stage from flowing through the pull-down diode of the third stage.

13 Claims, 6 Drawing Sheets

VOLTAGE BLOCKING METHOD AND APPARATUS FOR A CHARGE PUMP WITH DIODE CONNECTED PULL-UP AND PULL-DOWN ON BOOT NODES

This application is a continuation-in-part of U.S. Ser. No. 09/137,977, entitled "Charge Pump Apparatus With Diode Connected Pull-Up on Boot Nodes", filed Aug. 21, 1998 now abandoned.

FIELD OF THE INVENTION

The present invention pertains to the field of computer systems. More particularly, this invention pertains to the field of providing a charge pump for generating high voltages and high currents for erasing and programming flash electrically-erasable programmable read only memory arrays (flash EEPROMs).

BACKGROUND OF THE INVENTION

Flash EEPROMs play prominent and increasing roles in today's computer systems. Flash EEPROMs must be able to operate in computer systems where a supply voltage (Vcc) of 5V, 3V, or even smaller voltage is available to the EEPROM devices. However, performing program and erase operations within an EEPROM device requires that greater voltages than that supplied to the EEPROM be applied to the memory cells within the EEPROM. For example, a program operation might require that approximately 10.5V be applied to a memory cell. A voltage of approximately −10.5V might be required to perform an erase operation. These voltages are achieved within the EEPROM device by charge pump circuits. A positive charge pump can take a supplied Vcc voltage and create a voltage sufficient for programing operations. A negative charge pump can take a supplied ground voltage and create a negative voltage sufficient for erase operations. The negative and positive charge pumps must also be able to deliver sufficient current at the required voltage levels.

FIG. 1 shows a typical prior art positive charge pump 130. The charge pump 130 includes a number of stages of N type field effect transistors 131, 132, 133, and 134 connected in series between a source voltage Vcc and an output terminal Vout. Clock signals 1 and 3 are supplied to the circuit 130 from sources 1 and 3, respectively, via capacitors 136, 137, and 138. Clock signals 2 and 4 are supplied to the circuit 130 from sources 2 and 4, respectively, via capacitors 140, 141, and 142. Each stage of the circuit 130 includes an N channel field effect transistor device 143, 144, or 145 used to control the voltage at the gate terminal of the device 131, 132, or 133 of that stage.

FIG. 2 shows the clock signals referred to as clock 1, clock 2, clock 3, and clock 4 associated with the circuit 130. In order to understand the operation of the circuit 130, the operation of a single stage including the switching transistor 132 will be discussed. Following the prior art timing diagram of FIG. 2, clocks 3 and 4 are initially high. Because clock 3 is high, the control device 144 is initially on. When the clock 1 signal goes high, the voltage pulse applied through the capacitor 136 charges the capacitor 141 at the gate terminal of the device 132 through the device 144 to the voltage level of the gate terminal of the device 144 minus a threshold voltage drop. When the clock 3 then goes low, the device 144 turns off, isolating the gate of the device 132 and leaving the capacitor 141 charged. This also lowers the voltage at the source of the device 132 so that the device 132 begins to conduct. When the clock 2 then goes high, the voltage at the gate is appreciably higher than at the drain because of the precharging of the capacitor 141. This turns the device 132 on in the region where it experiences no threshold voltage drop. The elimination of the threshold voltage drop means that the circuit can provide increased current from the capacitor 136 to the next stage. The high voltage at the capacitor 136 begins to charge the capacitor 137 and to discharge the capacitor 142 through the device 145.

When the clock 2 then goes low, the device 132 begins to turn off. When the clock 3 goes high, the device 144 turns on discharging the gate of the device 132 and bringing it toward the voltage of the drain so that the device 132 turns off. When the clock 1 then goes low, the device 132 stays off and the device 144 stays on so that the charge at the drain and gate are equalized.

Viewing the circuit as a whole, when the device 131 comes on in response to the high clock 4, its gate has been charged through the device 143 which has gone off. Thus, the device 131 turns on without a threshold voltage drop and charges the capacitor 136 rapidly. Then the device 131 begins to turn off as the clock 4 goes low. The rising clock 1 pulse completes the turnoff of the device 131 by discharging the capacitor 140 through the device 143. The high clock 1 continues the charging of the capacitor 141 until the drop of the clock 3 turns off the device 144 leaving the gate of the device 132 charged. The lowering of the clock 3 begins turning on the device 132 which comes on completely without a threshold voltage drop when the clock 2 goes high and the gate of the device 132 goes above the drain. This allows the charging of the capacitor 137. The same sequence continues through whatever number of stages are present until the charge on the capacitor 138 is sufficient to turn on the device 134 to provide a pumped voltage level at the output of the circuit 130. It should be noted that the last stage operates in a range in which it experiences a threshold voltage drop.

In addition to experiencing a threshold voltage drop in the last stage, prior pump circuits such as that discussed above have the disadvantage of being unable to provide adequate current when required to operate with supply voltages below approximately 3 V. For example, the pump circuit 130 discussed above would be unable to produce adequate current when supplied with 1.8 V and pumping up to a voltage of 10.5 V. An analogous situation exists with prior negative charge pumps, where a negative pump may need to pump to a voltage of approximately −12.5 V when a supply voltage of 1.8 V is supplied to a flash EEPROM.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of a positive charge pump stage provides a charge pump stage circuit with diode connected pull-up and pull-down on a boot node. The pull-up includes a diode connected transistor which serves to precharge the gate of a switching transistor. The precharging of the switching transistor allows the transistor to operate in a region that allows voltage transfer from the current stage to the next stage without a threshold voltage drop across the switching transistor. The pull-down includes a diode-connected transistor that ensures that the switching transistor will turn off once the voltage transfer has occurred, thereby preventing current from flowing from the next stage back to the current stage. The pull-up and pull-down diode-connected transistors may be used in negative charge pumps in an analogous manner. Detailed discussions of both positive and negative charge pump embodiments follow. One intended advantage of the negative pump embodiment is providing sufficient current when pumping greater negative voltages required by emerging EEPROM devices operating in environments where supply voltages less than 3 V are available to the EPPROM device. An intended advantage of the positive and negative pump embodiments is a reduction in die area utilization made possible by an increase in current production. Another intended advantage of the positive and negative pump embodiments is the elimination of the threshold voltage drop across the output diode typically found on prior charge pumps. A further intended advantage of these embodiments is a reduced voltage swing on the boot nodes, thereby increasing charge pump efficiency over prior charge pumps. Another intended advantage is an increase in clock frequency that improves charge pump performance.

Figure 1:
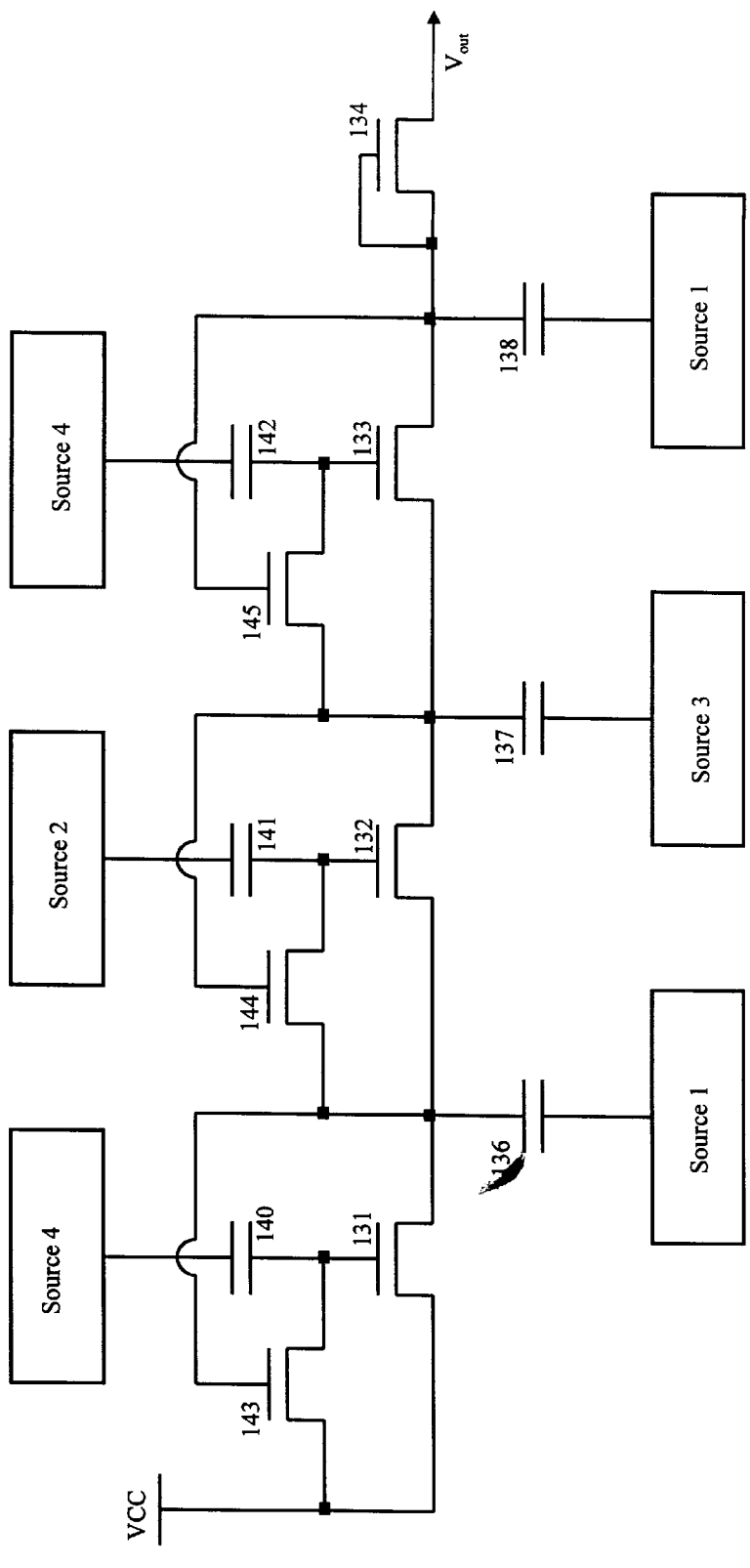
FIG. 1 shows a typical implementation of a prior art charge pump circuit
Figure 2:
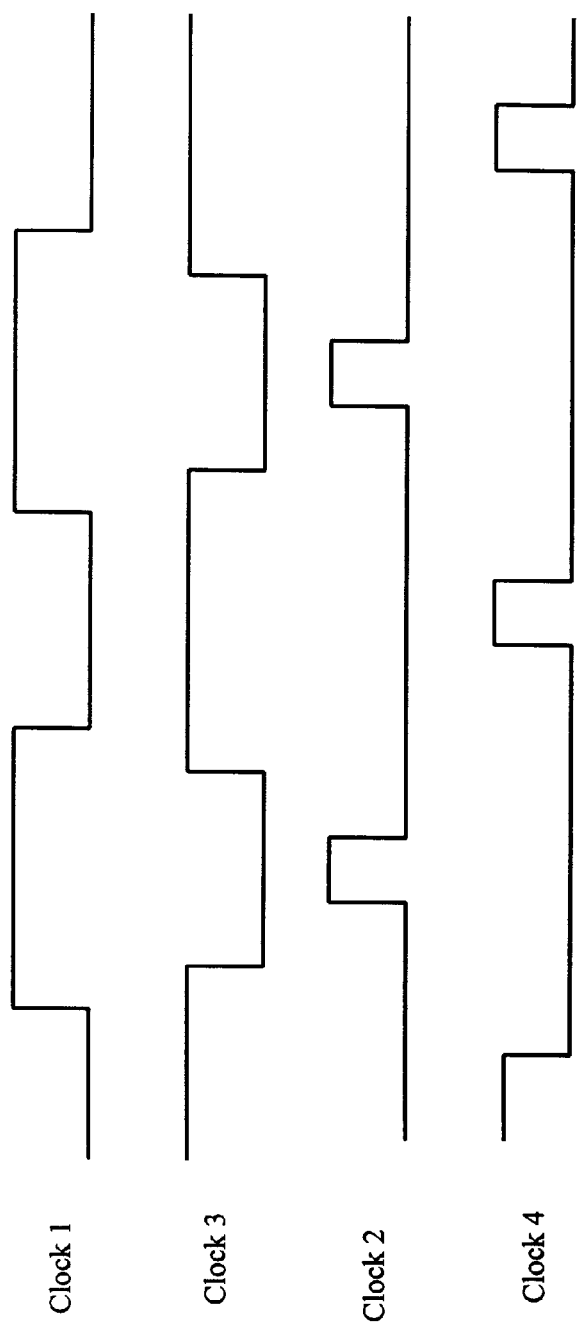
FIG. 2 shows a timing diagram of clock signals used in connection with the prior art charge pump circuit of FIG. 1.
Figure 3:
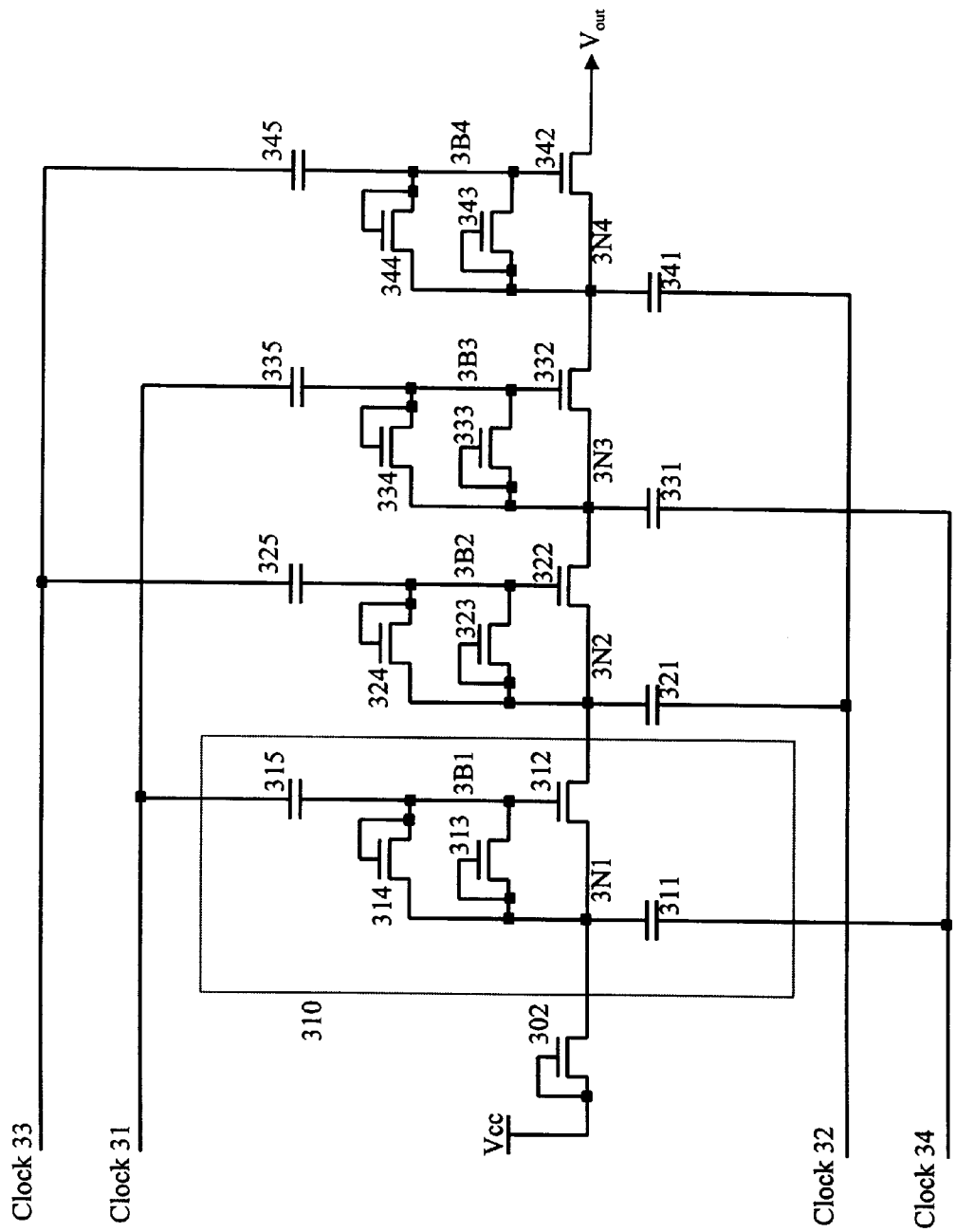
FIG. 3 is a circuit diagram of one embodiment of a positive charge pump circuit.

FIG. 3 is a circuit diagram of one embodiment of a positive charge pump. The embodiment of FIG. 3 includes switching transistors 312, 322, 332, and 342 connected in series between node 3N1 and Vout. The switching transistors 312, 322, 332, and 342 are preferably N type field effect transistors, although N' type devices may also be used. The embodiment of FIG. 3 further includes pull-up transistors 313, 323, 333, and 343. The pull-up transistors 313, 323, 333, and 343 are preferably N' type field effect transistors, although N type devices may also be used. N' type devices have lower threshold voltages than N type devices. The source terminals of pull-up transistors 313, 323, 333, and 343 are connected to the gate terminals of switching transistors 312, 322, 332, and 342, respectively. The pull-up transistors 313, 323, 333, and 343 are diode connected, with the drains and gates of pull-up transistors 313, 323, 333, and 343 connected to the drains of the switching transistors 312, 322, 332, and 342, respectively.

The embodiment of FIG. 3 further includes pull-down transistors 314, 324, 334, and 344. The pull-down transistors 314, 324, 334, and 344 are preferably N type field effect transistors. The drain terminals of the pull-down transistors 314, 324, 334, and 344 are connected to the drain terminals of switching transistors 312, 322, 332, and 342, respectively. The pull-down transistors 314, 324, 334, and 344 are diode connected, with the source and gate terminals of the pull-down transistors 314, 324, 334, and 344 connected to the gate terminals of the switching transistors 312, 322, 332, and 342, respectively.

Also included in the embodiment of FIG. 3 are storage capacitors 311, 321, 331, and 341. The storage capacitor 311 is connected between a clock 34 signal and the drain terminal of the switching transistor 312. The storage capacitor 321 is connected between a clock 32 signal and the drain terminal of the switching transistor 322. The storage capacitor 331 is connected between the clock 34 signal and the drain terminal of the switching transistor 332. The storage capacitor 341 is connected between the clock 32 signal and the drain terminal of the switching transistor 342.

The embodiment of FIG. 3 further includes the boot node capacitors 315, 325, 335, and 345. The boot node capacitor 315 is connected between a clock 31 signal and the gate terminal of the switching transistor 312. The boot node capacitor 325 is connected between a clock 33 signal and the gate terminal of the switching transistor 322. The boot node capacitor 335 is connected between the clock 31 signal and the gate terminal of the switching transistor 332. The boot node capacitor 345 is connected between the clock 33 signal and the gate of the switching transistor 342.

Nodes 3N1, 3N2, 3N3, and 3N4 are shown in FIG. 3. Node 3N1 is defined by the connection of the storage capacitor 311, the drain terminal of the switching transistor 312, the gate and drain terminals of the pull-up transistor 313, and the drain terminal of the pull-down transistor 314. Node 3N2 is defined by the connection of the storage capacitor 321, the drain terminal of the switching transistor 322, the source terminal of the switching transistor 312, the gate and drain terminals of the pull-up transistor 323, and the drain terminal of the pull-down transistor 324. Node 3N3 is defined by the connection of the storage capacitor 331, the drain terminal of the switching transistor 332, the source terminal of the switching transistor 322, the gate and drain terminals of the pull-up transistor 333, and the drain terminal of the pull-down transistor 334. Node 3N4 is defined by the connection of the storage capacitor 341, the drain terminal of the switching transistor 342, the source terminal of the switching transistor 332, the gate and drain terminals of the pull-up transistor 343, and the drain terminal of the pull-down transistor 344.

Boot nodes 3B1, 3B2, 3B3, and 3B4 are also shown in FIG. 3. Boot node 3B 1 is defined by the connection of the boot capacitor 315, the gate terminal of the switching capacitor 312, the source terminal of the pull-up transistor 313, and the source and gate terminals of the pull-down transistor 314. Boot node 3B2 is defined by the connection of the boot capacitor 325, the gate terminal of the switching capacitor 322, the source terminal of the pull-up transistor 323, and the source and gate terminals of the pull-down transistor 324. Boot node 3B3 is defined by the connection of the boot capacitor 335, the gate terminal of the switching capacitor 332, the source terminal of the pull-up transistor 333, and the source and gate terminals of the pull-down transistor 334. Boot node 3B4 is defined by the connection of the boot capacitor 345, the gate terminal of the switching capacitor 342, the source terminal of the pull-up transistor 343, and the source and gate terminals of the pull-down transistor 344.

The embodiment of FIG. 3 includes 4 positive charge pump stages. One of these stages is labeled as stage 310, and includes the storage capacitor 311, the switching transistor 312, the pull-up transistor 313, the pull-down transistor 314, and the boot capacitor 315. Stage 310 receives its input from an input diode transistor 302, which is connected in series between a Vcc source and node N1. Although the charge pump embodiment of FIG. 3 includes 4 stages, other numbers of stages are possible. The output of the charge pump embodiment of FIG. 3 is labeled as Vout which is the source terminal of the switching transistor 342.

Figure 4:
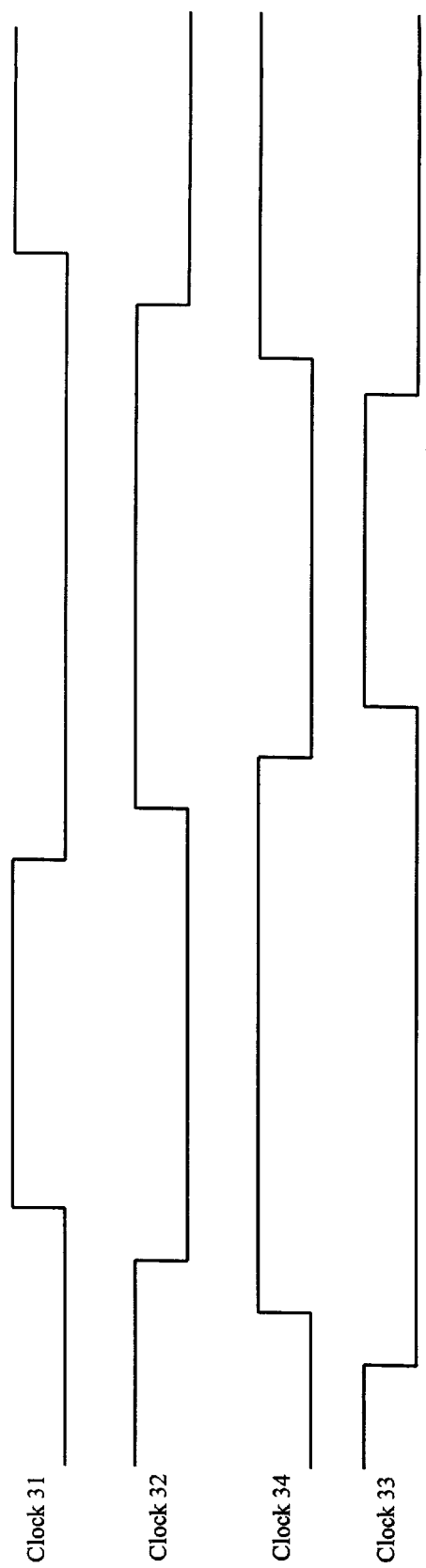
FIG. 4 shows a timing diagram of clock signals used in connection with the circuit of FIG. 3.

FIG. 4 shows a timing diagram of the clock signals 31, 32, 33, and 34 used in connection with the circuit of FIG. 3. All of the clock signals 31, 32, 33, and 34 are at Vcc when high and at ground when low. The following discussion will concentrate on the operation of the stage 310 beginning with the first low-to-high transition of clock 34. When the clock 34 is high and the clock 31 is low, the pull-up diode-connected transistor 313 is turned on resulting in the voltage on boot node 3B1 being one threshold voltage less than the voltage on node 3N 1. As a result of the voltage on boot node 3B 1, the switching transistor 312 is nearly turned on. When the clock 32 goes low, the node 3N2 is prepared to receive the voltage stored on node 3N 1. When the clock 31 goes high, the switching transistor 312 is turned on and the voltage stored on storage capacitor 311 is transferred to the storage capacitor 321. The diode connected pull-down transistor 314 serves to ensure that the switching transistor 312 turns off in order to prevent back flow from node 3N2 to node 3N1 when the voltage on node 3N2 is greater than the voltage on node 3N1. Although the clocks 31, 32, 33, and 34 of FIG. 4 are shown to overlap, in other words no two clock edges are shown to occur simultaneously, there is no requirement for the clocks to overlap. Clock edges may occur nearly simultaneously, although a small overlap, preferably approximately 2ns, may be used in order to account for the non-vertical nature of clock edges.

An intended advantage of the embodiment of FIG. 3 is the elimination of the requirement of overlapping clock periods typically found with prior charge pump circuits. Overlapping clock periods are not required in the embodiment of FIG. 3 because the voltage on the boot nodes 3B1, 3B2, 3B3, and 3B4 are dependent on the voltages on the nodes 3N1, 3N2, 3N3, and 3N4, respectively, and not on the voltages present at following stages, as is the case with prior pump circuits. The elimination of the overlapping clocks allows for an increase in clock frequency, which improves pump circuit performance.

Figure 5:
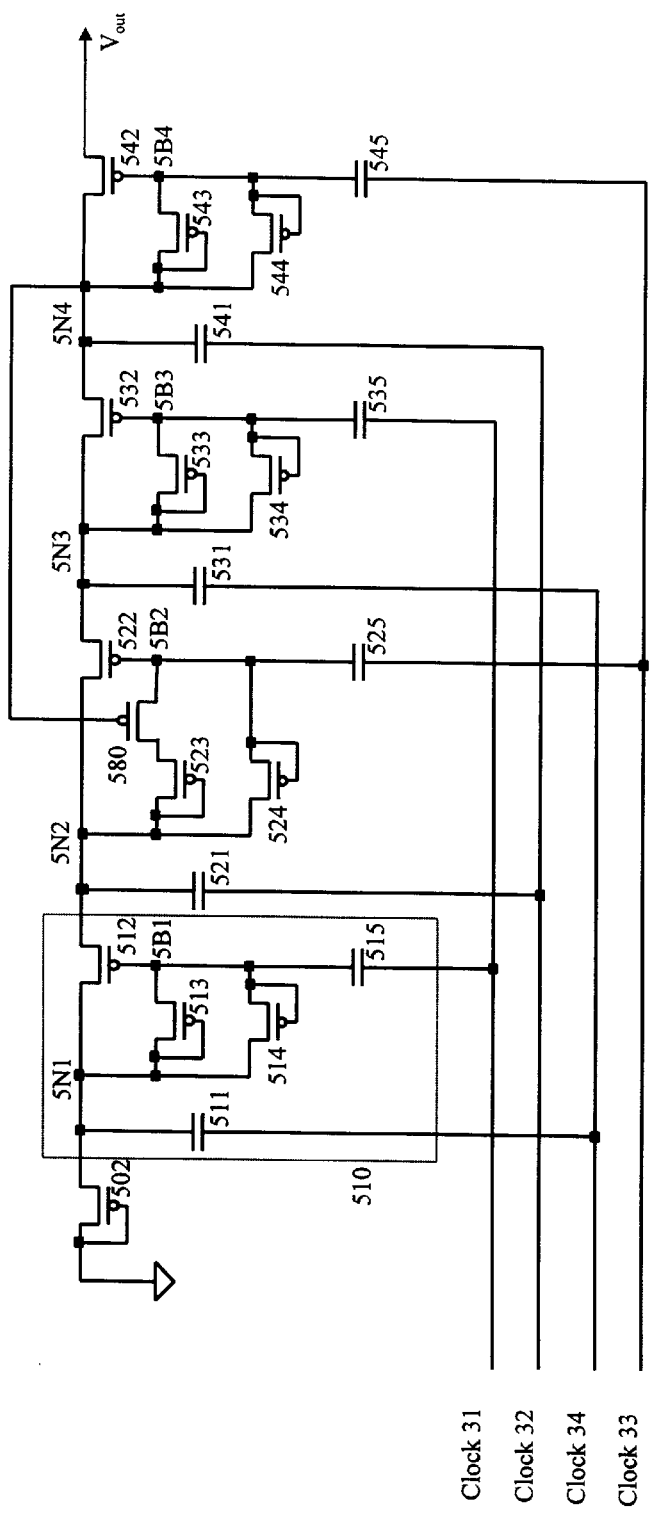
FIG. 5 is a circuit diagram of one embodiment of a negative charge pump circuit.

FIG. 5 is a circuit diagram of one embodiment of a negative charge pump. The embodiment of FIG. 5 includes switching transistors 512, 522, 532, and 542 connected in series between node 5N1 and Vout. The switching transistors 512, 522, 532, and 542 are preferably P type field effect transistors, although P' type devices may also be used. The embodiment of FIG. 5 further includes pull-down transistors 513, 523, 533, and 543. The pull-down transistors 513, 523, 533, and 543 are preferably P' type field effect transistors, although P type devices may also be used. P' type devices have lower threshold voltages than P type devices. The drain terminals of pull-down transistors 513, 533, and 543 are connected to the gate terminals of switching transistors 512, 532, and 542, respectively, while pull-down transistor 523 is connected between node 5N2 and a blocking transistor 580. The pull-down transistors 513, 523, 533, and 543 are diode connected, with the source terminals and gate terminals of pull-down transistors 513, 523, 533, and 543 connected to the source terminals of the switching transistors 512, 522, 532, and 542, respectively.

The embodiment of FIG. 5 further includes pull-up transistors 514, 524, 534, and 544. The pull-up transistors 514, 524, 534, and 544 are preferably P type field effect transistors. The source terminals of pull-up transistors 514, 524, 534, and 544 are connected to the source terminals of the switching transistors 512, 522, 532, and 542, respectively. The pull-up transistors 514, 524, 534, and 544 are diode connected, with the drain and gate terminals of the pull-up transistors 514, 524, 534, and 544 connected to the gate terminals of the switching transistors 512, 522, 532, and 542, respectively.

Also included in the embodiment of FIG. 5 are storage capacitors 511, 521, 531, and 541. The storage capacitor 511 is connected between a clock 54 signal and the source terminal of the switching transistor 512. The storage capacitor 521 is connected between a clock 52 signal and the source terminal of the switching transistor 522. The storage capacitor 531 is connected between the clock 54 signal and the source terminal of the switching transistor 532. The storage capacitor 541 is connected between the clock 52 signal and the source terminal of the switching transistor 542.

The embodiment of FIG. 5 further includes the boot node capacitors 515, 525, 535, and 545. The boot node capacitor 515 is connected between a clock 51 signal and the gate terminal of the switching transistor 512. The boot node capacitor 525 is connected between a clock 53 signal and the gate terminal of the switching transistor 522. The boot node capacitor 535 is connected between the clock 51 signal and the gate terminal of the switching transistor 532. The boot node capacitor 545 is connected between the clock 53 signal and the gate of the switching transistor 542.

Nodes 5N1, 5N2, 5N3, and 5N4 are shown in FIG. 5. Node 5N1 is defined by the connection of the storage capacitor 511, the source terminal of the switching transistor 512, the gate and source terminals of the pull-down transistor 513, and the source terminal of the pull-up transistor 514. Node 5N2 is defined by the connection of the capacitor 521, the source terminal of the switching transistor 522, the drain terminal of the switching transistor 512, the gate and source terminals of the pull-down transistor 523, and the source terminal of the pull-up transistor 524. Node 5N3 is defined by the connection of the storage capacitor 531, the source terminal of the switching transistor 532, the drain terminal of the switching transistor 522, the gate and source terminals of the pull-down transistor 533, and the source terminal of the pull-up transistor 534. Node 5N4 is defined by the connection of the storage capacitor 541, the source terminal of the switching transistor 542, the drain terminal of the switching transistor 532, the gate and source terminals of the pull-down transistor 543, and the source terminal of the pull-up transistor 544.

Boot nodes 5B1, 5B2, 5B3, and 5B4 are also shown in FIG. 5. Boot node 5B1 is defined by the connection of the boot capacitor 515, the gate terminal of the switching capacitor 512, the drain terminal of the pull-down transistor 513, and the drain and gate terminals of the pull-up transistor 514. Boot node 5B2 is defined by the connection of the boot capacitor 525, the gate terminal of the switching capacitor 522, the drain terminal of the pull-down transistor 523, and the drain and gate terminals of the pull-up transistor 524. Boot node 5B3 is defined by the connection of the boot capacitor 535, the gate terminal of the switching capacitor 532, the drain terminal of the pull-down transistor 533, and the drain and gate terminals of the pull-up transistor 534. Boot node 5B4 is defined by the connection of the boot capacitor 545, the gate terminal of the switching capacitor 542, the drain terminal of the pull-down transistor 543, and the drain and gate terminals of the pull-up transistor 544.

The embodiment of FIG. 5 includes 4 negative charge pump stages. One of these stages is labeled as stage 510, and includes the storage capacitor 511, the switching transistor 512, the pull-down transistor 513, the pull-up transistor 514, and the boot capacitor 515. Stage 510 receives its input from an input diode transistor 502, which is connected in series between ground source and node N1. Although the charge pump embodiment of FIG. 5 includes 4 stages, other numbers of stages are possible. The output of the charge pump embodiment of FIG. 5 is labeled as Vout which is the source terminal of the switching transistor 542.

Figure 6:
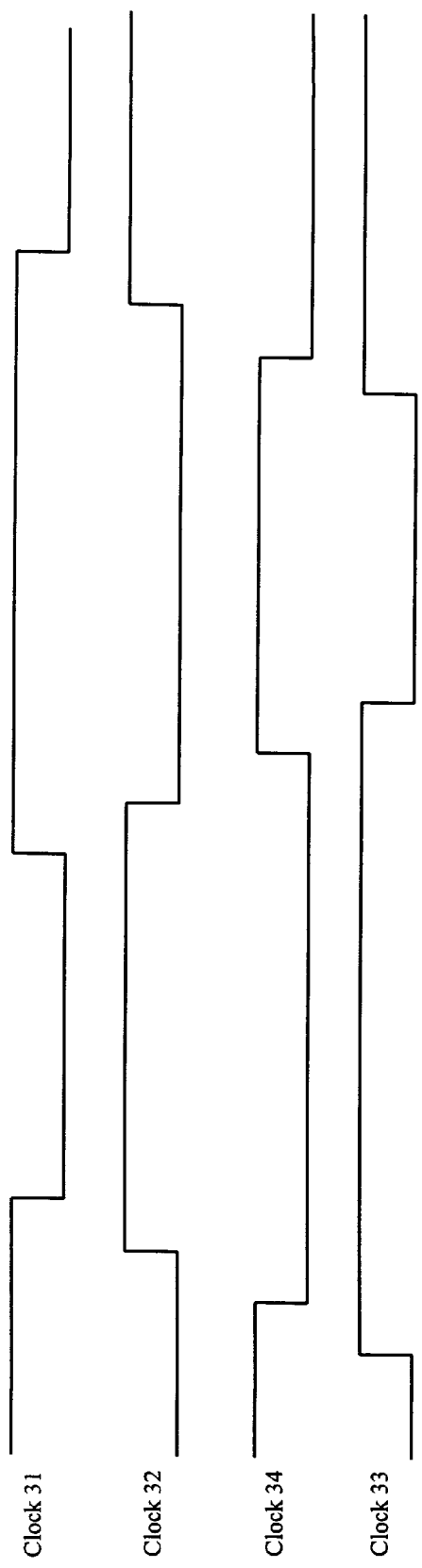
FIG. 6 shows a timing diagram of clock signals used in connection with the circuit of FIG. 5.

FIG. 6 shows a timing diagram of the clock signals 51, 52, 53, and 54 used in connection with the circuit of FIG. 5. All of the clock signals 51, 52, 53, and 54 are at Vcc when high and at ground when low. The following discussion will concentrate on the operation of the stage 510 beginning with the first high-to-low transition of clock 54. When the clock 54 is low and the clock 51 is high, the pull-down diode-connected transistor 513 is turned on resulting in the voltage on boot node 5B1 being one threshold voltage less negative than the voltage on node 5N 1. As a result of the voltage on boot node 5B1, the switching transistor 512 is nearly turned on. When the clock 52 goes high, the node 5N2 is prepared to receive the voltage stored on node 5N1. When the clock 51 goes low, the switching transistor 512 is turned on and the voltage stored on storage capacitor 511 is transferred to the storage capacitor 521. The diode connected pull-up transistor 514 serves to ensure that the switching transistor turns 512 turns off in order to prevent back flow from node 5N2 to node 5N1 when the voltage on node 5N2 is more negative than the voltage on node 5N1. Although the clocks 51, 52, 53, and 54 of FIG. 6 are shown to overlap, in other words no two clock edges are shown to occur simultaneously, there is no requirement for the clocks to overlap. Clock edges may occur nearly simultaneously, although a small overlap, preferably approximately 2ns, may be used in order to account for the non-vertical nature of clock edges.

As with the embodiment of FIG. 3, an intended advantage of the embodiment of FIG. 5 is the elimination of the requirement of overlapping clock periods typically found with prior charge pump circuits. Overlapping clock periods are not required in the embodiment of FIG. 5 because the voltage on the boot nodes 5B1, 5B2, 5B3, and 5B4 are dependent on the voltages on the nodes 5N1, 5N2, 5N3, and 5N4, respectively, and not on the voltages present at following stages, as is the case with prior pump circuits. The elimination of the overlapping clocks allows for an increase in clock frequency, which improves pump circuit performance.

The negative charge pump circuit of FIG. 5 may be implemented in a programmable logic device. In such devices, during programming operations a positive voltage may appear at the Vout terminal. Unless this voltage is blocked in some fashion, a short would occur between Vout and the ground terminal at transistor 502. A short of this nature would prevent proper programming operations. In order to prevent this positive voltage from propagating all the way to the ground terminal at diode 502, a positive voltage approximately equal in magnitude to the positive voltage seen at Vout can be applied to the gate of transistor 522. This positive voltage turns off transistor 522, and the positive voltage seen at Vout does not conduct through transistor 522. The blocking transistor 580 is included in order to prevent the positive voltage applied to the gate terminal of transistor 522 from flowing through the diode connected transistor 523, which would also create a short to the ground terminal. The gate of blocking transistor 580 in this embodiment is coupled to node 5N4. The voltage at node 5N4 is delivered to the gate of blocking transistor 580, thereby turning off transistor 580 and preventing the positive voltage applied to the gate of transistor 522 from flowing through the diode connected transistor 523. Transistor 580 is a P type device.

When the negative pump circuit of FIG. 5 begins to pump and a negative voltage is delivered to Vout, the positive voltage applied to the gate of transistor 522 during programming operations is removed and the negative voltage at node 5N4 is delivered to the gate of blocking transistor 580. Because the voltage at node 5N4 is more negative than the voltage at node 5N2 and because the pump stages including nodes 5N2 and 5N4 are clocked in phase with each other, the blocking transistor 580 is always enabled during pump operation. For maximum efficiency, the voltage difference between node 5N4 and nodes 5B4 and 5N2 should be sufficient to ensure that the blocking transistor 580 operates in a range that provides negligible voltage drop across the blocking transistor 580. A greater voltage difference can be achieved by placing the blocking transistor further away from node 5N4. For example, rather than locating the blocking transistor 580 two stages from the output as shown in FIG. 5, it is possible to locate the blocking transistor four stages from the output (for pump circuits with five or more stages). The blocking transistor may be located in other pump stages, but the voltage applied to the gate of the blocking transistor should be in phase with the voltage developed at the stage in which the blocking device is located in order to ensure that the blocking transistor will always be enabled during pump operation.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. A negative charge pump circuit, comprising:
    a first, a second, and a third stage, each stage including a switching transistor, a pull up diode coupled between a gate terminal and a source terminal of the switching transistor, and a pull down diode coupled between the gate terminal and the source terminal of the switching transistor; and
    a blocking transistor coupled between the gate terminal of the switching transistor and the pull down diode of the third stage, a gate terminal of the blocking transistor electrically coupled to the source terminal of the switching transistor of the first stage, the first stage to provide an output for the negative charge pump circuit.

2. The negative charge pump circuit of claim 1 wherein a voltage present at the output of the first stage is delivered to the gate terminal of the blocking transistor of the third stage when a positive programming voltage is present at the output of the first stage.

3. The negative charge pump circuit of claim 2, wherein the blocking transistor is a p-type field effect transistor.

4. A negative charge pump circuit, comprising:
    a first, a second, a third, a fourth, and a fifth stage, each stage including a switching transistor, a pull up diode coupled between a gate terminal and a source terminal of the switching transistor, and a pull down diode coupled between the gate terminal and the source terminal of the switching transistor; and
    a blocking transistor coupled between the gate terminal of the switching transistor and the pull down diode of the fifth stage, a gate terminal of the blocking transistor electrically coupled to the source terminal of the switching transistor of the first stage, the first stage to provide an output for the negative charge pump circuit.

5. The negative charge pump circuit of claim 4 wherein a voltage present at the output of the first stage is delivered to the gate terminal of the blocking transistor of the fifth stage when a positive programming voltage is present at the output of the first stage.

6. The negative charge pump circuit of claim 5, wherein the blocking transistor is a p-type field effect transistor.

7. A method for blocking a positive voltage in a negative charge pump circuit, comprising:

applying a positive voltage to a gate terminal of a switching transistor; and applying a positive voltage to a gate terminal of a blocking transistor, the blocking transistor coupled between the gate terminal and a source terminal of the switching transistor, wherein applying a positive voltage to the gate terminal of the blocking transistor includes applying a positive voltage to a gate terminal of a blocking transistor coupled between the gate terminal of the switching transistor and a pull-down diode, the pull-down diode coupled between the blocking transistor and the source terminal of the switching transistor, and further wherein applying a positive voltage to the gate terminal of the blocking transistor includes applying a positive voltage to a gate terminal of a blocking transistor in a pump stage circuit located two stages away from an output stage.

8. A method for blocking a positive voltage in a negative charge pump circuit, comprising:

applying a positive voltage to a gate terminal of a switching transistor; and applying a positive voltage to a gate terminal of a blocking transistor, the blocking transistor coupled between the gate terminal and a source terminal of the switching transistor, wherein applying a positive voltage to the gate terminal of the blocking transistor includes applying a positive voltage to a gate terminal of a blocking transistor coupled between the gate terminal of the switching transistor and a pull-down diode, the pull-down diode coupled between the blocking transistor and the source terminal of the switching transistor, and further wherein applying a positive voltage to a gate terminal of a blocking transistor includes applying a positive voltage to a gate terminal of a blocking transistor in a pump stage circuit located four stages away from an output stage.

9. A negative charge pump stage circuit, comprising:

a switching transistor including a gate terminal, a drain terminal, and a source terminal;

a first capacitor having a first terminal and a second terminal, the first terminal electrically coupled to a first clock source and the second terminal electrically coupled to the source of the first transistor;

a second capacitor having a first terminal and a second terminal, the first terminal electrically coupled to a second clock source and the second terminal electrically coupled to the gate of the first transistor;

a first diode having an input terminal and an output terminal, the input terminal electrically coupled to the source of the first transistor, and the output terminal electrically coupled to the gate of the first transistor;

a second diode having an input terminal and an output terminal; and a blocking transistor, the input terminal of the second diode coupled to a drain of the blocking transistor, the output terminal of the second diode electrically coupled to the source of the first transistor, a source of the blocking transistor coupled to the gate of the switching transistor, the gate of the blocking transistor to receive a positive voltage when a positive voltage is present at the gate of the switching transistor to prevent the positive voltage present at the gate of the switching transistor from conducting to the source of the switching transistor.

10. The negative charge pump stage circuit of claim 9 wherein the first clock source deasserts a first clock signal before the second clock source deasserts a second clock signal, the first clock signal to remain deasserted until after the second clock source asserts the second clock signal.

11. The negative charge pump stage circuit of claim 10 wherein the switching transistor and the blocking transistor are P type field effect transistors.

12. The negative charge pump stage circuit of claim 11 wherein the first diode includes a P type field effect transistor, the first diode transistor including a gate terminal, a drain terminal, and a source terminal, the gate and source terminals electrically coupled together to form the input terminal of the first diode and the drain terminal of the first diode transistor to form the first diode.

13. The negative charge pump stage circuit of claim 12 wherein the second diode includes a P type field effect transistor, the second diode transistor including a gate terminal, a drain terminal, and a source terminal, the gate and source terminals electrically coupled together to form the input terminal of the second diode and the drain terminal of the second diode transistor to form the output terminal of the second diode.

* * * * *

UNITED STATES PATENT AND TRADEMARK OFFICE
CERTIFICATE OF CORRECTION

PATENT NO.    : 6,373,324 B2
DATED         : April 16, 2002
INVENTOR(S)   : Li et al.

Page 1 of 1

It is certified that error appears in the above-identified patent and that said Letters Patent is hereby corrected as shown below:

Column 1,
Line 34, delete "programing", insert -- programming --.

Column 10,
Line 39, before "first diode", insert -- output terminal of --.

Signed and Sealed this

Twenty-sixth Day of November, 2002

Attest:

Attesting Officer

JAMES E. ROGAN
Director of the United States Patent and Trademark Office